(12) United States Patent
Rameshwar et al.

(10) Patent No.: US 10,339,029 B2
(45) Date of Patent: Jul. 2, 2019

(54) AUTOMATICALLY DETECTING INTERNALIZATION (I18N) ISSUES IN SOURCE CODE AS PART OF STATIC SOURCE CODE ANALYSIS

(71) Applicant: CA, Inc., New York, NY (US)

(72) Inventors: Kumar Arnesh Rameshwar, Pune (IN); Guru Prasadareddy Narapu Reddy, Hyderabad (IN)

(73) Assignee: CA, Inc., New York, NY (US)

( * ) Notice: Subject to any disclaimer, the term of this patent is extended or adjusted under 35 U.S.C. 154(b) by 24 days.

(21) Appl. No.: 15/340,492

(22) Filed: Nov. 1, 2016

(65) Prior Publication Data

US 2018/0121338 A1 May 3, 2018

(51) Int. Cl.
G06F 11/36 (2006.01)
G06F 8/41 (2018.01)
G06F 9/451 (2018.01)

(52) U.S. Cl.
CPC .......... *G06F 11/3604* (2013.01); *G06F 8/427* (2013.01); *G06F 9/454* (2018.02); *G06F 11/36* (2013.01); *G06F 11/3688* (2013.01)

(58) Field of Classification Search
None
See application file for complete search history.

(56) References Cited

U.S. PATENT DOCUMENTS

2002/0107684 A1* 8/2002 Gao .................. G06F 8/51
704/4

OTHER PUBLICATIONS

G. Ann Campbell, "SonarQube in Action", Oct. 2013, Manning Publications (Year: 2013).*
Lingoport Globalyzer, "User's Guide, Fixing Source Code", Jun. 3, 2016.
Simon Brandhof, "Extending Coding Rules", Jun. 2, 2016.
Lingoport, "Three integrated components to create & maintain software for any language or cultural format in every sprint.", accessed Jun. 3, 2016.
Stack Overflow, "Static Analysis tool to detect Internationalization issues", Jun. 3, 2016.

* cited by examiner

*Primary Examiner* — Francisco J Aponte
*Assistant Examiner* — Mark A Gooray
(74) *Attorney, Agent, or Firm* — Baker Botts L.L.P.

(57) ABSTRACT

A method of detecting potential internationalization issues in source code may include installing a plug-in component in a stand-alone static source code analysis program/application that is configured to enable detection of internationalization issues in source code. The method may also include automatically creating a repository comprising a plurality of internationalization rules for a plurality of programming languages that are provided by the plug-in and accessing a subset of the plurality of internationalization rules corresponding to a particular programming language of the plurality of programming languages. The method may include creating a quality profile for the particular programming language using the subset of the plurality of internationalization rules, scanning source code of a software product for potential issues on a block level, and identifying and displaying the detected internationalization issues in the source code.

18 Claims, 4 Drawing Sheets

AUTOMATICALLY DETECTING INTERNALIZATION (I18N) ISSUES IN SOURCE CODE AS PART OF STATIC SOURCE CODE ANALYSIS

BACKGROUND

The present disclosure relates to detecting internationalization (i18n) issues in source code, more particularly, to systems and methods for automatically detecting potential internationalization issues as part of static source code analysis.

Many companies use static source code analysis to find and fix issues with source code before generating a build for testing purposes. This helps reduce the number of issues during a testing phase and improves the code quality of a product/application. However, existing static source code analysis tools may not have the capability to detect all potential types of issues in source code, such as internationalization related issues. A company creating products for international markets will need to ensure a product is internationalization-ready before localizing it for each country in its international market.

BRIEF SUMMARY

According to an aspect of the present disclosure, a method may include the steps of installing a plug-in component in a stand-alone static source code analysis program/application, wherein the plug-in component is configured to enable detection of internationalization issues in source code and automatically creating a repository comprising a plurality of internationalization rules for a plurality of programming languages. The plurality of internationalization rules may be provided by the plug-in. The method may also include steps of accessing a subset of the plurality of internationalization rules corresponding to a particular programming language of the plurality of programming languages, creating a quality profile for the particular programming language using the subset of the plurality of internationalization rules, scanning source code of a software product for potential issues, wherein scanning occurs on a block level, identifying detected internationalization issues in the source code, formatting for display the detected internationalization issues, and suggesting a solution to fix the detected internationalization issues.

According to another aspect of the present disclosure, a non-transitory computer-readable storage medium may have instructions stored thereon that may be executable by a computing system to: install a plug-in component in a static source code analysis application, automatically create a quality profile for a particular programming language of the source code, scan the source code for potential issues, wherein scanning occurs on a block level, identify a plurality of detected internationalization issues in the source code, and generate a problem statement based on the plurality of detected internationalization issues. The plug-in component may be configured to enable detection of internationalization issues in source code of a software product.

According to another aspect of the present disclosure, a computer configured to access a storage device may include a graphical user interface, a processor, and a non-transitory, computer-readable storage medium storing computer-readable instructions. The instructions, when executed by the processor, may cause the computer to perform: installing a plug-in component in a static source code analysis application, accessing a repository comprising a plurality of internationalization rules for a plurality of programming languages, creating a quality profile for a particular programming language of the source code using a subset of the plurality of internationalization rules corresponding to the particular programming language, scanning the source code for potential issues, wherein scanning occurs on a block level, identifying a plurality of detected internationalization issues in the source code, and suggesting a solution to fix the plurality of detected internationalization issues. The plug-in component may be configured to enable detection of internationalization issues in source code of a software product. The plurality of internationalization rules may be stored in the plug-in.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure management, systems and methods disclosed herein may be related to other areas beyond network infrastructure. Systems and methods disclosed herein may be related to, and used by, any predictive system that utilizes expert learning or other predictive methods. Systems and methods disclosed herein may be applicable to a broad range of applications that, such as, for example, research activities (e.g., research and design, development, collaboration), commercial activities (e.g., sales, advertising, financial evaluation and modeling, inventory control, asset logistics and scheduling), IT systems (e.g., computing systems, cloud computing, network access, security, service provisioning), medicine (e.g., diagnosis or prediction within a particular specialty or sub-specialty), and other activities of importance to a user or organization.

Although static source code analysis techniques exist for computer software applications, they may not have the capability to detect issues in the source code relating to internationalization and localization issues. The failure to detect internationalization issues before localizing a software product can lead to significant monetary expenses.

In view of the foregoing, a need has arisen for ways to detect internationalization issues as part of static source code analysis during the development phase before check-in of the source code for production.

Systems and methods disclosed herein may provide a way to present users with a mechanism for detecting internationalization issues during the development phase, in particular, creating a plug-in to be used with existing platforms for static source code analysis.

Figure 1:
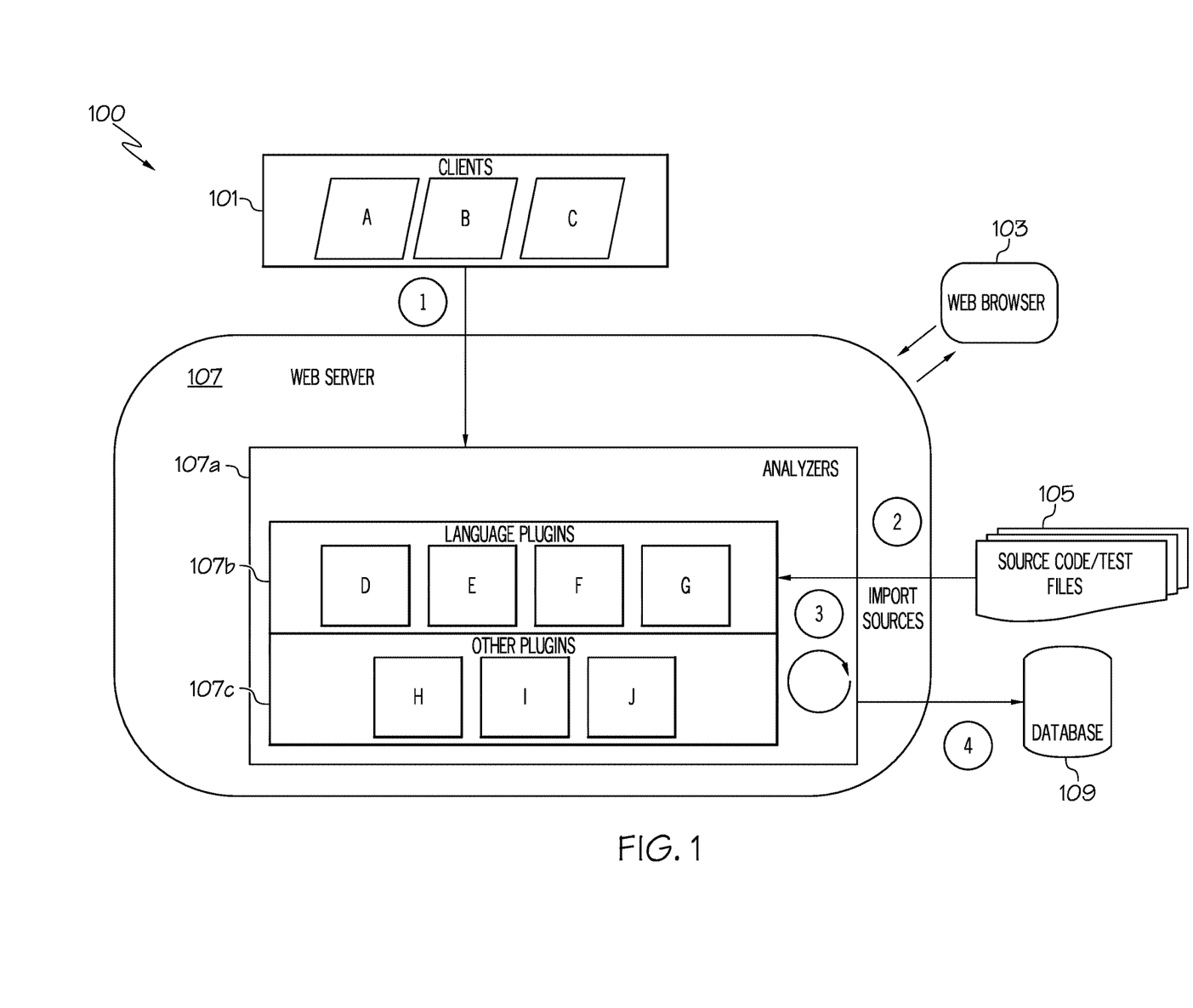
FIG. 1 illustrates a schematic representation of a system architecture for conducting static source code analysis.

Referring now to FIG. 1, an embodiment of an overall system architecture for detecting internationalization issues in source code using a plug-in is depicted. System 100 may include various clients 101A-C, which may communicate with web server 107 to launch a new analysis of a source code project. Web server 107 may communicate with web browser 103. Web server 107 may receive source code or test files 105 and be able to support plugins. Supporting plugins may enable a program to engage in customization. Web server 107 may include analyzers 107a, such as language plugins 107bD-G and other plugins 107cH-J. Language plugins may include Java, C++, etc. A plugin may be a software component that adds a specific feature to an existing computer program. In the example of FIG. 1, plugins 107bD-G may be language plugins to enable the static source code analysis tool to scan and analyze code written in a variety of programming languages. Plugins 107cH-J may add additional features, such as plugin 107cH for detecting potential internationalization issues. It may be more costly and risky to address i18n issues during testing and maintenance phases of source code development, rather than the coding phase. Internationalization issue detection plugin 107cH may enable source code developers to find i18n-related issues in the source code during a coding phase of development. Analyzers 107a may analyze files, compute metrics, and provide solutions/suggestions for fixing the detected potential internationalization issues. Metrics and the detected potential internationalization issues may be stored in database 109.

Web server 107 may be a static source code analysis platform, such as SonarQube® or any other suitable static source code analysis tool. In the example of SonarQube, the SonarQube platform may generally include 4 components: 1) SonarQube Server; 2) SonarQube Database; 3) SonarQube Plugin(s); and 4) SonarQube Scanners. The SonarQube Server may be a web server for developers and managers to browse quality snapshots and configure the SonarQube instance and a search server based on, e.g., Elasticsearch, to back searches from a user interface. The SonarQube Database may store the configuration of the SonarQube instance (e.g., security, plugin settings, etc.) and quality snapshots of projects, views, etc. Plugins may be installed on the server and may include language, SCM, integration, authentication, governance, and internationalization plugins. The SonarQube Scanners run on a Build/Continuous Integration Server to analyze projects. In the example embodiment of SonarQube as the static source code analysis tool, SonarQube may enable detection of duplications, coding standards, lack of coverage, potential bugs, complexity, documentation, and design issues, but may not have the capability to find internationalization issues in code. Plugin 107cH may provide the additional function of identifying potential internationalization issues to a static source code analysis tool, such as SonarQube.

A set of internationalization rules may be created and predefined in i18n plugin 107cH and used when scanning source code to detect potential internationalization issues in the source code. The internationalization rules may be categorized into types, such as embedded/hard coded strings, critical functions or locale sensitive methods/classes/function, and concatenated strings. Embedded texts denote hard coded text strings in a product's source code. As hard coded strings, they will not be translated by a localization team and will remain in the original coding language. Critical Functions are functions that might not behave correctly from an internationalization point of view as they, e.g., do not support Unicode encodings or are restricted to representations that do not take locale dependencies into account. Methods/classes/functions may include data, time, number, message, or currency formatting issues. Concatenated strings are messages that are dynamically built at run time and are composed of several text strings. Such messages usually result in poor translations, as translators can only see the isolated text strings of which the message is composed. Each string might be translated correctly, but the composed message may be irritating and incomprehensible. A set of internationalization rules may be specific to a particular programming language, such as Java or C++. For example, a set of internationalization rules applicable to Java may be created and stored in the i18n plugin and a set of internationalization rules applicable to C++ may also be created and stored in the i18n plugin. A set of internationalization rules may be created and stored in the i18n plugin for any suitable programming language.

A rules repository may be created in the static source code analysis tool, such as SonarQube, based on the rules stored in the i18n plugin. A plugin typically registers itself with the host application or program and a protocol may generally enable the exchange of data between the host application and plugin. This may allow the plugin to extend the functionality of the host application while allowing the host application to continuing operating independently of the plugin. An individual quality profile may be created in the static source code analysis tool, such as SonarQube, for each programming language by accessing a subset of the rules stored in the repository that are corresponding to each programming language. When performing an analysis of a product or project, the quality profile for the particular programming language of that product or project's source code may be applied during the analysis and scanning of the code to detect potential internationalization issues. For example, when analyzing a product written in Java, web server 107 may identify the language of the file type as Java, or whichever particular programming language is used by the source code. The set of rules stored in i18n plugin corresponding to Java may be accessed and used to create a Java quality profile to detect potential internationalization issues in the product's source code.

The i18n plugin enables detection of potential internationalization issues in the code and helps developers to understand the problem and suggests a solution to fix the issue. Detecting potential internationalization issues before check-in may save companies who are localizing software significant amounts of money by enabling detection of potential internationalization issues earlier in the development process. With internationalization plugin 107cH, a developer may use various programming language profiles created as part of the plug-in and scan their code to detect internationalization issues. In addition to detecting internationalization issues, the plugin may give a problem statement and suggest a solution for the problem. By integrating with an Integrated Development Environment (IDE), like Eclipse, IntelliJ, or Visual Studio, a developer may actually find and fix internationalization issues before check-in of the code for build generation.

Internationalization plugin 107cH may create a repository in the static source code analysis tool, such as SonarQube, which will contain the internationalization rules for a plurality of programming languages. These rules may be added to a Quality Profile, which detects internationalization issues in the code of a project or product. For example, a quality profile may exist for Java, which can be included as one of the profile before beginning a scan of code written in Java to find internationalization issues. Similarly, there may also be a quality profile C++ and any other suitable programming language. A project may be created in web server 107 which requires static source code analysis to be performed, including detecting internationalization issues. The i18n quality profiles may be added to web server 107. The code may then be scanned to find internationalization issues. The project may be associated with an IDE to facilitate the analysis. In preview analysis, internationalization issues may be found and fixed before check-in of the source code into a source code repository.

During the analysis, source code of a project is scanned. Normally, static source code tools look at code at on a line-by-line basis or at a line level. This has the disadvantage of not providing the whole context of a text string if the string spans more than one line of code, and can result in false positives of issue detection. In computer programming, some programming languages permit the creation of blocks or code blocks. A block or code block is typically a section of code which is grouped together and includes one or more declarations and statements. The syntax for a block or code block may be specific to the programming language used. For example, a block statement (which may be called compound statement in other languages) may be used to group zero or more statements and is delimited by a pair of curly brackets in Java. When viewing an individual line of code in isolation, a potential internationalization issue may be flagged as detected. However, when scanned in view of and in awareness of the context and content of surrounding lines of code, it may be revealed that there actually is not an internationalization issue.

Internationalization plugin 107cH, as depicted in FIG. 1, scans at a block level and searches code through comparing each block to saved patterns based on the quality profiles, created using contents of the rule repository, not just scanning one line in isolation from the surrounding lines of code. When a portion of the code matches or meets a rule in the quality profile, then it indicates a potential internationalization issue has been detected. System 100 allows source code to be scanned block-by-block or at a block level to analyze code for potential i18n issues and display any detected issues.

Figure 2:
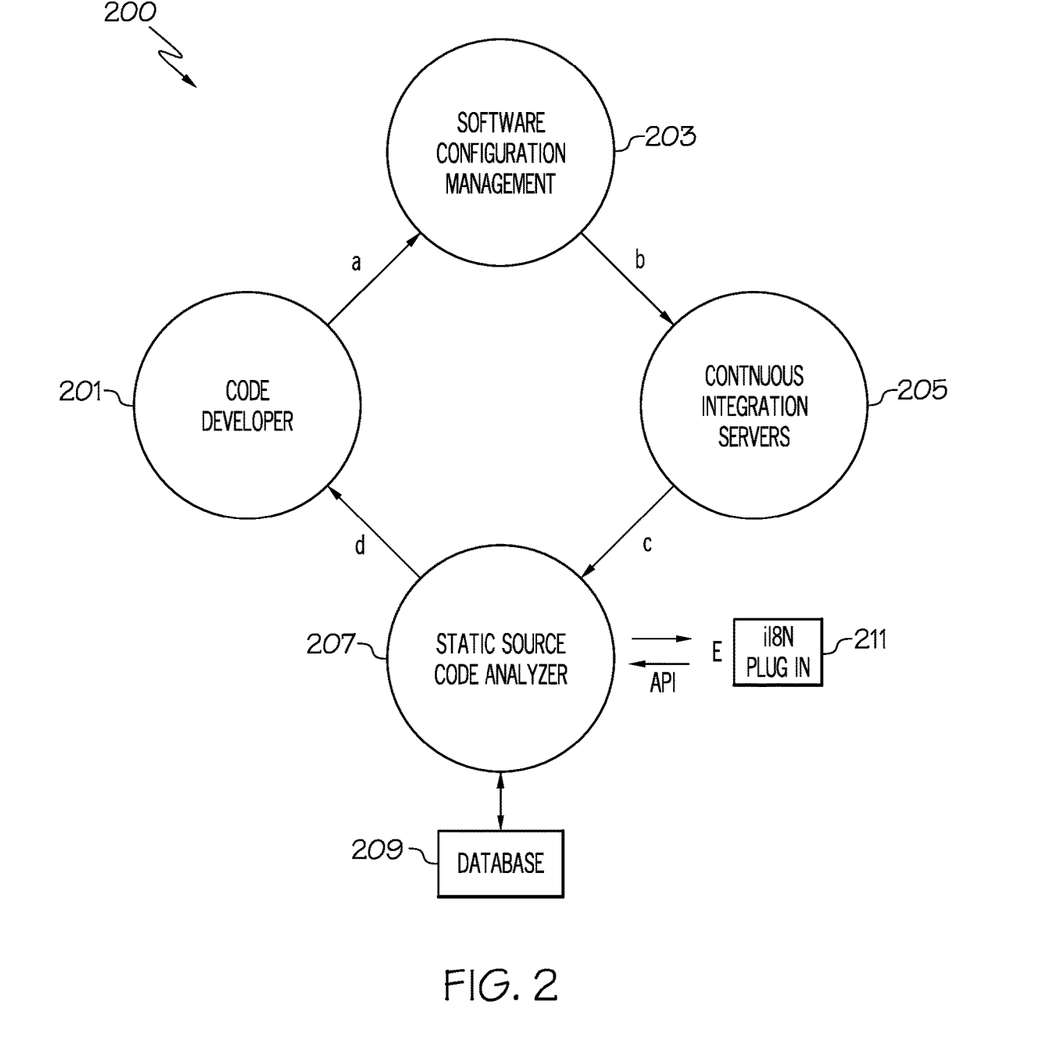
FIG. 2 illustrates a schematic representation of a development process of source code.

Referring now to FIG. 2, a flow diagram of a process 200 for review of source code to detect issues is depicted. A code developer 201 may want to perform local analysis of the source code of their product or project. The source code may be in any suitable programming language, including Java, C#, VBNET, C/C++, Objective-C, Swift, PHP, JS, CSS, HTML, Groovy, ABAP, COOBOL, etc. The code developer may interact with software configuration management 203, such as CVS, Jazz RTC, ClearCase, Perforce, etc. Automatic build and code analysis may occur when continuous integration servers 205 receive information from the software configuration management. Continuous integration servers 205 may include Bamboo or TeamCity and may perform code analysis. Continuous integration servers 205 may publish analysis reports to static source code analysis tool 207. Static source code analysis tool 207 may be SonarQube® or any other suitable static source code analysis platform. Static source code analysis tool 207 may communicate with code developer 201 to manage issues. Static source code analysis tool 207 may also communicate with a database 209. Static source code analysis tool 207 may also communicate with various plugin components to add different functionalities and detect additional types of issues in the source code, such as internationalization plugin 211, as depicted in FIG. 2.

Figure 3:
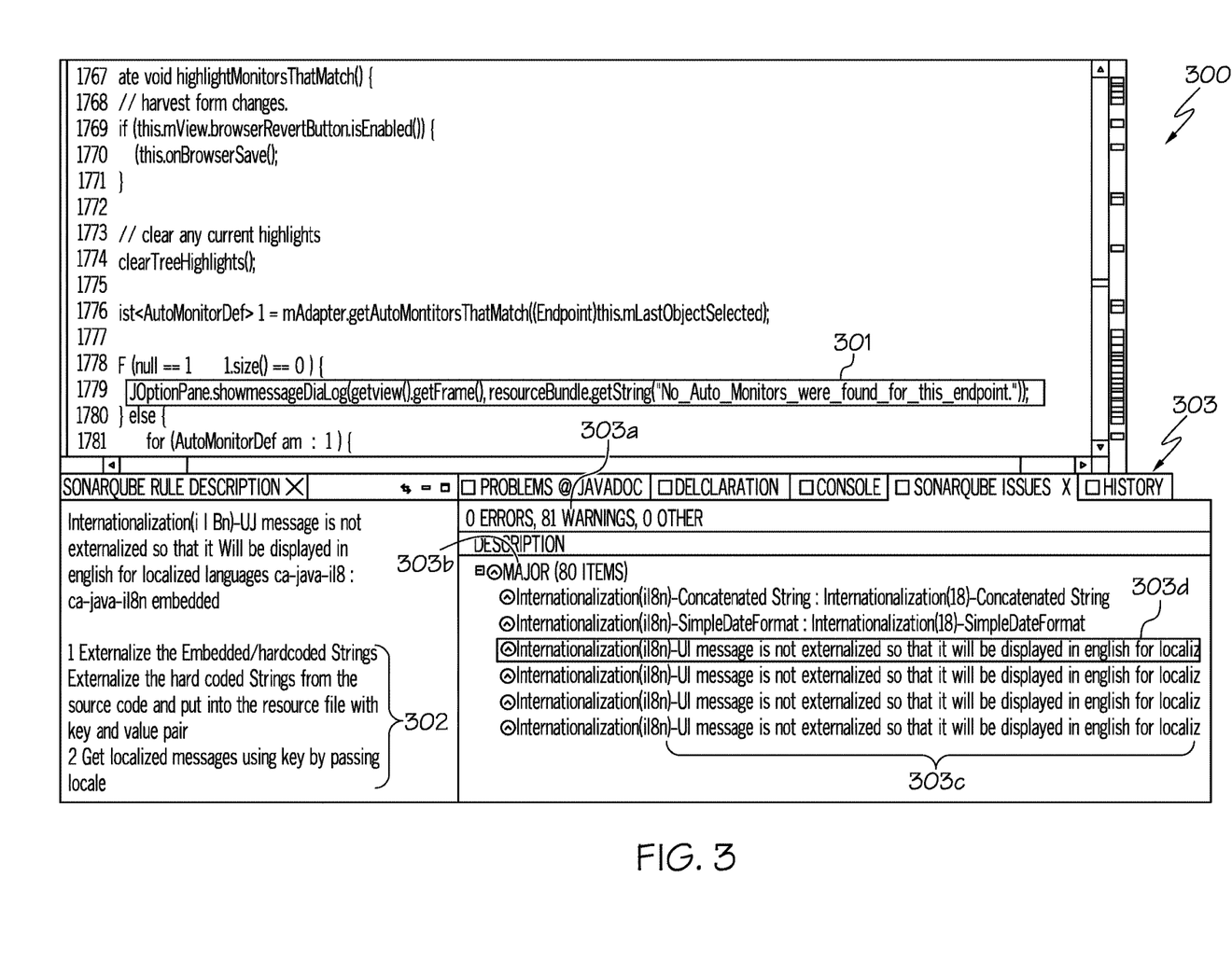
FIG. 3 illustrates a schematic representation of a display of a detected potential internationalization issue.

Referring now to FIG. 3, a display of a detected internationalization issue 301 within source code is depicted. A list 303 of detected i18n issues may be displayed in display 300. Display may include an icon 303a showing the number of issues detected in each file. Display may provide an indication of the level of severity 303b. Display may provide a description of the type of issue 303c. All i18n issues may be defined as major or minor and by the technical depth of the issue. Once the detected issues are identified and displayed at a graphical user interface, or any suitable display, a code developer or manager may select a particular issue 303d and receive a description of that particular issue 302, including a suggested solution and steps to be taken by the developer or manager to implement the solution and fix the issues in the source code before check-in. An estimate of how much time it will take to fix the issue may also be displayed.

Figure 4:
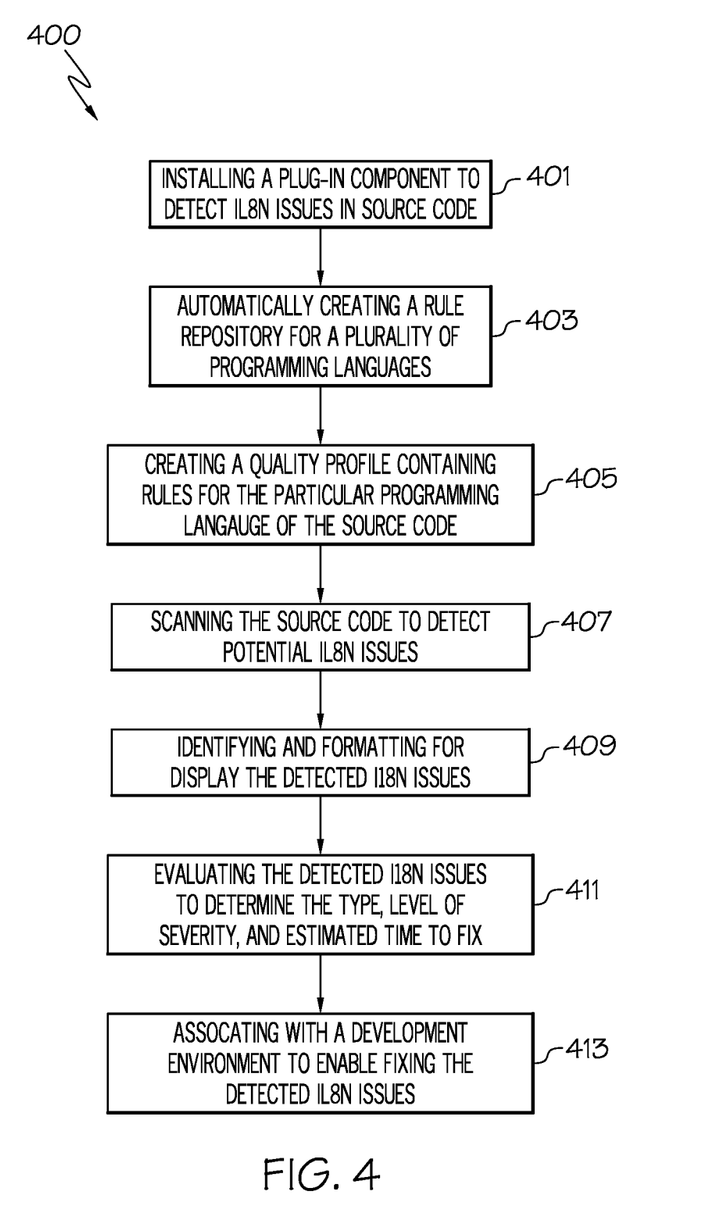
FIG. 4 illustrates a flow chart for utilizing a plugin component to detect potential internationalization issues during source code analysis.

Referring now to FIG. 4, a flow diagram of a process 40 for utilizing a plugin to detect internationalization issues is depicted. At step 401, a plug-in component to detect internationalization issues in source code is installed into a static source code analysis platform. A rule repository for a plurality of programming languages is automatically created at step 403 upon installation of the plug-in using rules defined and stored in the plug-in. At step 405, a quality profile is created which contains the rules for the particular programming language of the source code. The source code is scanned to detect potential internationalization issues at step 407. At step 409, the detected internationalization issues are identified and formatted for display. The detected internationalization issues are evaluated at step 411 to determine the type of issue, level of severity, and estimated time to fix the issue. At step 413, associating with a development environment enables fixing the detected internationalization issues.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   installing a plug-in component in a stand-alone static source code analysis program/application, wherein the plug-in component contains a plurality of sets of internationalization rules, wherein each respective set is configured to enable the detection of internationalization issues in source code of a particular programming type that is different from respective programming language types corresponding to other sets;
   automatically creating a repository comprising the plurality of sets of internationalization rules during the installation of the plug-in;

accessing a first set of the plurality of sets of internationalization rules;

creating a first quality profile for a first programming language type using the first set of the plurality of sets of internationalization rules, corresponding to the first programming language type;

accessing a second set of the plurality of sets of internationalization rules;

creating a second quality profile for a second programming language type using the second set of the plurality of sets of internationalization rules, corresponding to the second programming language type;

scanning source code of a software product for potential issues, wherein scanning source code comprises scanning at block level and searching code by comparing each block to a rule in a quality profile, wherein the quality profile used is the first quality profile when the source code is written in the first programming language type or the second quality profile if the source code is written in the second programming language type;

identifying detected internationalization issues in the source code when a block of code matches or meets a rule in the quality profile;

formatting for display the detected internationalization issues; and suggesting a solution to fix the detected internationalization issues.

2. The method of claim 1, wherein suggesting a solution to fix the detected internationalization issues comprises;

generating a problem statement for use by a developer of the software product, wherein the problem statement provides a list of internationalization issues and other source code issues; and implementing the suggested solution.

3. The method of claim 1, wherein implementing the suggested solution comprises:

associating with an integrated development environment (DE) to enable fixing the detected issues.

4. The method of claim 1, wherein scanning the source code comprises:

comparing each block of the source code to the quality profile; and in response to a determination that a portion of the source code satisfies at least one rule of the plurality of sets subset of internationalization rules in the quality profile, indicating a potential internationalization issue has been detected.

5. The method of claim 1, further comprising categorizing the plurality of internationalization rules based on a type of rule.

6. The method of claim 1, further comprising:

classifying the severity of each of the detected internationalization issues; and determining an estimated amount of time to fix each of the detected internationalization issues.

7. A non-transitory computer-readable storage medium having instructions stored thereon that are executable by a computing system to:

install a plug-in component in a static source code analysis application, wherein the plugin component contains a plurality of sets of internationalization rules, wherein each respective set is configured to enable the detection of internationalization issues in source code of a particular programming type that is different from respective programming language types corresponding to other sets;

automatically create a repository comprising the plurality of sets of internationalization rules during the installation of the plug-in;

access a first set of the plurality of sets of internationalization rules;

create a first duality profile for a first programming language type using the first set of the plurality of sets of internationalization rules, corresponding to the first programming language type;

accessing a second set of the plurality of sets of internationalization rules:

creating a second quality profile for a second programming language type using the second set of the plurality of sets of internationalization rules, corresponding to the second programming language type;

scan the source code for potential issues at block level and searching code by comparing each block to a rule in a quality profile, wherein the quality profile used is the first quality profile when the source code is written in the first programming language type;

identify a plurality of detected internationalization issues in the source code when a block of code matches or meets a rule in the quality profile; and generate a problem statement based on the plurality of detected internationalization issues.

8. The non-transitory computer-readable storage medium of claim 7, wherein to generate the problem statement based on the detected internationalization issues, the instructions are executable by the computing system to:

format for display the plurality of detected internationalization issues; and suggest a solution to fix the plurality of detected internationalization issues.

9. The non-transitory computer-readable storage medium of claim 8, wherein the plurality of detected internationalization issues comprise a first detected internationalization issue, and wherein to format for display the first detected internationalization issue, the instructions are executable by the computing system to:

categorize a type of internationalization issue of the first detected internationalization issue;

classify a level of severity of the first detected internationalization issue; and determine an estimated amount of time to fix the first detected internationalization issue.

10. The non-transitory computer-readable storage medium of claim 9, wherein the instructions are executable by the computing system to associate with an integrated development environment (IDE) to enable fixing the first detected internationalization issue.

11. The non-transitory computer-readable storage medium of claim 7, wherein to scan the source code for potential issues, the instructions are executable by the computing system to:

compare each block of the source code to the quality profile; and in response to a determination that a portion of the source code satisfies at least one rule of the subset of internationalization rules in the quality profile, indicating a potential internationalization issue has been detected.

12. The non-transitory computer-readable storage medium of claim 7, wherein the instructions are executable by the computing system to categorize the plurality of internationalization rules based on a type of rule.

13. The non-transitory computer-readable storage medium of claim 9, wherein the plurality of detected internationalization issues further comprises a second detected internationalization issue, and wherein to format for display the second detected internationalization issue, the instructions are executable by the computing system to:

categorize a type of internationalization issue of the second detected internationalization issue;

classify the severity of the second detected internationalization issue; and  determine an estimated amount of time to fix the second detected internationalization issue, wherein the type of internationalization issue of the second detected internationalization issue is different than the type of internationalization issue of the first detected internationalization issue, the severity of the second detected internationalization issue is more severe than the first detected internationalization issue, and the estimated amount of time to fix the second detected internationalization issue is greater than the first detected internationalization issue.

14. A computer configured to access a storage device, the computer comprising:

a graphical user interface;

a processor; and a non-transitory, computer-readable storage medium storing computer-readable instructions that when executed by the processor cause the computer to perform:

installing a plug-in component in a static source code analysis application, wherein the plug-in component contains a plurality of sets of internationalization rules, wherein each respective set is configured to enable the detection of internationalization issues in source code of a particular programming type that is different from respective programming language types corresponding to other sets;

automatically create a repository comprising the plurality of sets of internationalization rules during the installation of the plug-in;

access a first set of the plurality of sets of internationalization rules;

create a first quality profile for a first programming language type using the first set of the plurality of sets of internationalization rules, corresponding to the first programming language type;

accessing a second set of the plurality of sets of internationalization rules;

creating a second quality profile for a second programming language type using the second set of the plurality of sets of internationalization rules, corresponding to the second programming language type;

scanning source code for potential issues at block level and searching code by comparing each block to a rule in a quality profile, wherein the quality profile type used is the first quality profile when the source code is written in the first programming language type;

identifying a plurality of detected internationalization issues in the source code when a block of code matches or meets a rule in the quality profile; and   suggesting a solution to fix the plurality of detected internationalization issues.

15. The computer of claim 14, wherein the plurality of detected internationalization issues comprise a first detected internationalization issue, and the computer-readable instructions further comprise instructions that when executed by the processor cause the computer to perform categorizing a type of internationalization issue of the first detected internationalization issue.

16. The computer of claim 15, wherein the computer-readable instructions further comprise instructions that when executed by the processor cause the computer to perform:

classifying a severity level of the first detected internationalization issue; and  determining an estimated amount of time to fix the first detected internationalization issue.

17. The computer of claim 16, wherein to perform suggesting the solution to fix the plurality of detected internationalization issues, the instructions are executable by the processor to:

format for display at the graphical user interface the type of internationalization issue of the first detected internationalization issue, the severity level of the first detected internationalization issue, and the estimated amount of time to fix the first detected internationalization issue.

18. The computer of claim 14, wherein to perform scanning the source code for potential issues, the instructions are executable by the processor to:

identify a plurality of blocks of code within the source code;

compare each block of the plurality of blocks within the source code to the quality profile; and  in response to a determination that code within a particular block of the source code satisfies at least one rule of the subset of internationalization rules in the quality profile, indicate a potential internationalization issue has been detected.

\* \* \* \* \*